(12) United States Patent
DiFoggio et al.

(10) Patent No.: US 8,893,547 B2
(45) Date of Patent: Nov. 25, 2014

(54) ACOUSTIC TRANSDUCERS USING QUANTUM TUNNELING COMPOSITE ACTIVE ELEMENTS

(75) Inventors: Rocco DiFoggio, Houston, TX (US); Paul A. Bergren, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 509 days.

(21) Appl. No.: 13/220,205

(22) Filed: Aug. 29, 2011

(65) Prior Publication Data
US 2012/0055243 A1 Mar. 8, 2012

Related U.S. Application Data

(60) Provisional application No. 61/379,622, filed on Sep. 2, 2010.

(51) Int. Cl.
*E21B 47/06* (2012.01)
*G01V 1/52* (2006.01)

(52) U.S. Cl.
CPC ............ *G01V 1/52* (2013.01); *G01V 2001/526* (2013.01)
USPC ...................................................... 73/152.51

(58) Field of Classification Search
CPC ....... H01C 10/106; H01C 10/10; H01C 7/027
USPC ......................................... 73/152.28, 152.51
See application file for complete search history.

(56) References Cited

U.S. PATENT DOCUMENTS

| | | | |
|---|---|---|---|
| 3,586,889 A * | 6/1971 | Kolter ........................... | 310/329 |
| 5,163,521 A | 11/1992 | Pustanyk et al. | |
| 5,969,638 A * | 10/1999 | Chin ........................... | 340/855.3 |
| 6,495,069 B1 | 12/2002 | Lussey et al. | |
| 6,594,602 B1 * | 7/2003 | Schultz .......................... | 702/104 |
| 6,597,821 B1 * | 7/2003 | Bohnert et al. ................. | 385/12 |
| 6,646,540 B1 | 11/2003 | Lussey | |
| 6,697,598 B2 | 2/2004 | Hauptmann | |
| 7,145,423 B2 | 12/2006 | Suzuki et al. | |
| 7,145,432 B2 | 12/2006 | Lussey et al. | |
| 7,186,356 B2 | 3/2007 | Lussey et al. | |
| 7,205,983 B2 | 4/2007 | Raap et al. | |
| 7,320,252 B2 * | 1/2008 | Jones .......................... | 73/861.63 |
| 7,513,147 B2 | 4/2009 | Yogeswaren | |
| 7,578,431 B2 | 8/2009 | Tanner et al. | |

(Continued)

OTHER PUBLICATIONS

Bloor, D. et al.; "A metal-polymer composite with unusual properties," Journal of Physics D: Applied Physics 38 (2005), pp. 2851-2860.

(Continued)

*Primary Examiner* — John Fitzgerald
(74) *Attorney, Agent, or Firm* — Cantor Colburn LLP

(57) ABSTRACT

In one aspect, the disclosure provides an apparatus for use downhole that includes at least one acoustic sensor. In one aspect, the acoustic sensor includes a chamber and an active element comprised of a quantum tunneling composite in the chamber. In another aspect, the acoustic sensor may further include a pair of conductive layers on a pair of sides of the active element. The chamber is filled with an electrically non-conductive fluid. The active element may be placed in the chamber in a manner that causes the active element to be responsive to acoustic waves along a selected direction or in a manner that enables the active element to be non-directional.

23 Claims, 2 Drawing Sheets

(56) References Cited

U.S. PATENT DOCUMENTS

| | | | |
|---|---|---|---|
| 7,603,917 | B2 | 10/2009 | Graham et al. |
| 7,731,094 | B2 | 6/2010 | Phillips |
| 7,855,934 | B2 * | 12/2010 | Kitchin et al. ............... 367/4 |
| 2004/0082414 | A1 | 4/2004 | Knox |
| 2004/0217331 | A1 * | 11/2004 | Lussey et al. ............. 252/500 |
| 2004/0263312 | A1 | 12/2004 | Johnson et al. |
| 2005/0055145 | A1 | 3/2005 | Bober et al. |
| 2005/0274199 | A1 * | 12/2005 | Jones ..................... 73/861.63 |
| 2006/0182297 | A1 | 8/2006 | Cyr et al. |
| 2006/0238644 | A1 | 10/2006 | Lee |
| 2007/0252035 | A1 * | 11/2007 | Hubbard, Jr. ............. 244/75.1 |
| 2008/0015061 | A1 | 1/2008 | Klein |
| 2008/0035740 | A1 | 2/2008 | Tanner |
| 2009/0166037 | A1 * | 7/2009 | Sroka ...................... 166/264 |
| 2009/0191988 | A1 | 7/2009 | Klein |
| 2010/0165788 | A1 | 7/2010 | Rayssiguier et al. |
| 2010/0242615 | A1 * | 9/2010 | Sato et al. ................... 73/702 |

OTHER PUBLICATIONS

Bloor, D. et al.; "Metal-polymer composite with nanostructured filler particles and amplified physical properties," American Institute of Physics, Applied Physics Letter 88, 102103 (2006), pp. 1-3.

QTC Science; http://www.peratech.com/qtcscience.php, (Sep. 19, 2011).

QTC Technology; http://www.peratech.com/qtctechnology.php, (Sep. 19, 2011).

International Search Report and Written Opinion of the International Searching Authority, or the Declarations for International Application No. PCT/US2011/050351; all references are cited above, Mar. 2012.

* cited by examiner

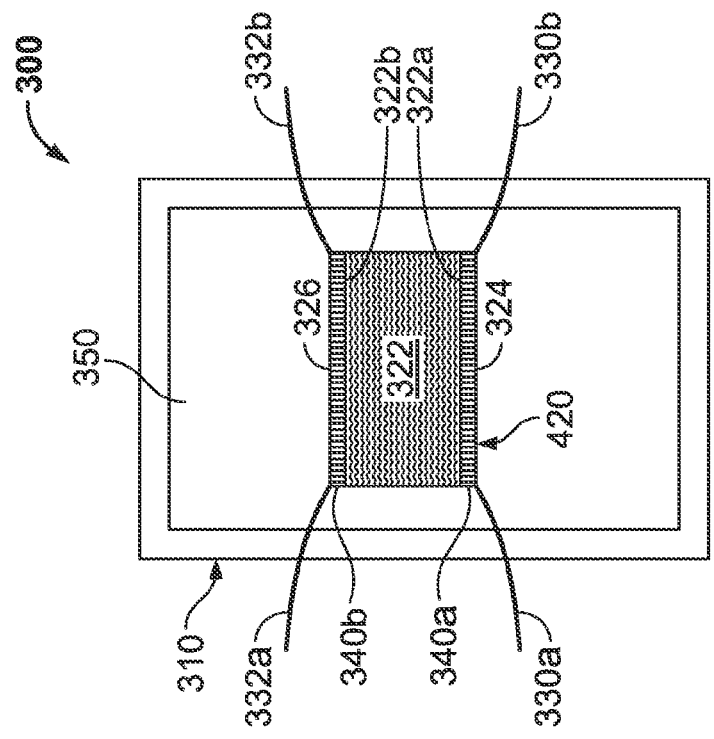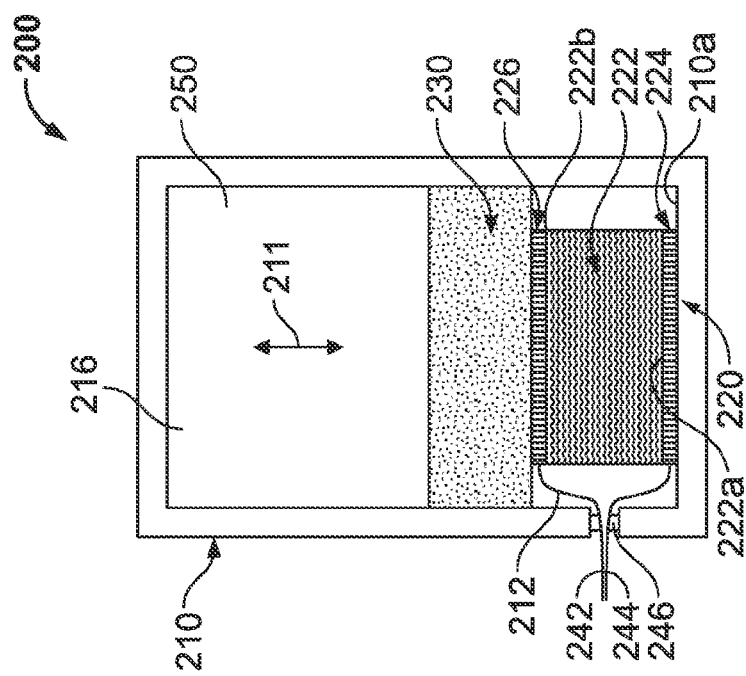

ACOUSTIC TRANSDUCERS USING QUANTUM TUNNELING COMPOSITE ACTIVE ELEMENTS

CROSS REFERENCES TO RELATED APPLICATIONS

This application takes priority from U.S. Provisional application Ser. No. Ser. No. 61/379,622; filed Sep. 2, 2010, which is incorporated herein in its entirety by reference.

BACKGROUND INFORMATION

This disclosure relates to acoustic sensors and methods of making and using such acoustic sensors in various tools, including acoustic logging tools.

Typically, downhole acoustic logging tools, which are used for estimating formation properties, include one or more acoustic transmitters or sources and a number of acoustic receivers. The transmitters induce acoustic energy into the formation surrounding the wellbore. The acoustic signals are reflected by interfaces associated with the wellbore and formation. The reflected acoustic signals are detected by the receivers in the logging tool and processed to provide estimates of one or more properties of the formation. A large number of acoustic sensors utilize piezoelectric ceramic elements as active elements. Some downhole tools utilize as many as 24 acoustic receivers. Seismic spreads use several thousand acoustic receivers for obtaining seismic data. The piezoelectric ceramic elements are relatively large and expensive. The present disclosure provides acoustic and vibration sensors that utilize quantum tunneling composites as active elements.

SUMMARY

One embodiment of the disclosure is an apparatus that includes a tool body that houses an acoustic sensor, wherein the acoustic sensor includes a chamber and an active element comprised of a quantum tunneling composite ("QTC") member in the chamber. In another aspect, the acoustic sensor further includes a pair of conductive layers on a pair of sides of the active element. The chamber is filled with an electrically non-conductive fluid. In one configuration, a mass in the chamber is configured to enable the active element to move in a selected direction so that the active element is primarily responsive to acoustic waves traveling along the selected direction (geophone configuration). In another embodiment, the active element is suspended in the chamber so that the active element is responsive to acoustic waves impinging from all directions (hydrophone configuration).

Examples of certain features of the apparatus and method disclosed herein are summarized rather broadly in order that the detailed description thereof that follows may be better understood. There are, of course, additional features of the apparatus and method disclosed hereinafter that will form the subject of the claims appended hereto.

BRIEF DESCRIPTION OF THE DRAWINGS

The present disclosure is best understood with reference to the accompanying figures in which like numerals refer to like elements and in which:

FIG. 2 is line diagram of directional acoustic sensor made according to one embodiment of the disclosure; and FIG. 3 is a line diagram of a non-directional acoustic sensor made according to another embodiment of the disclosure.

DESCRIPTION OF ILLUSTRATIVE EMBODIMENTS

Figure 1:
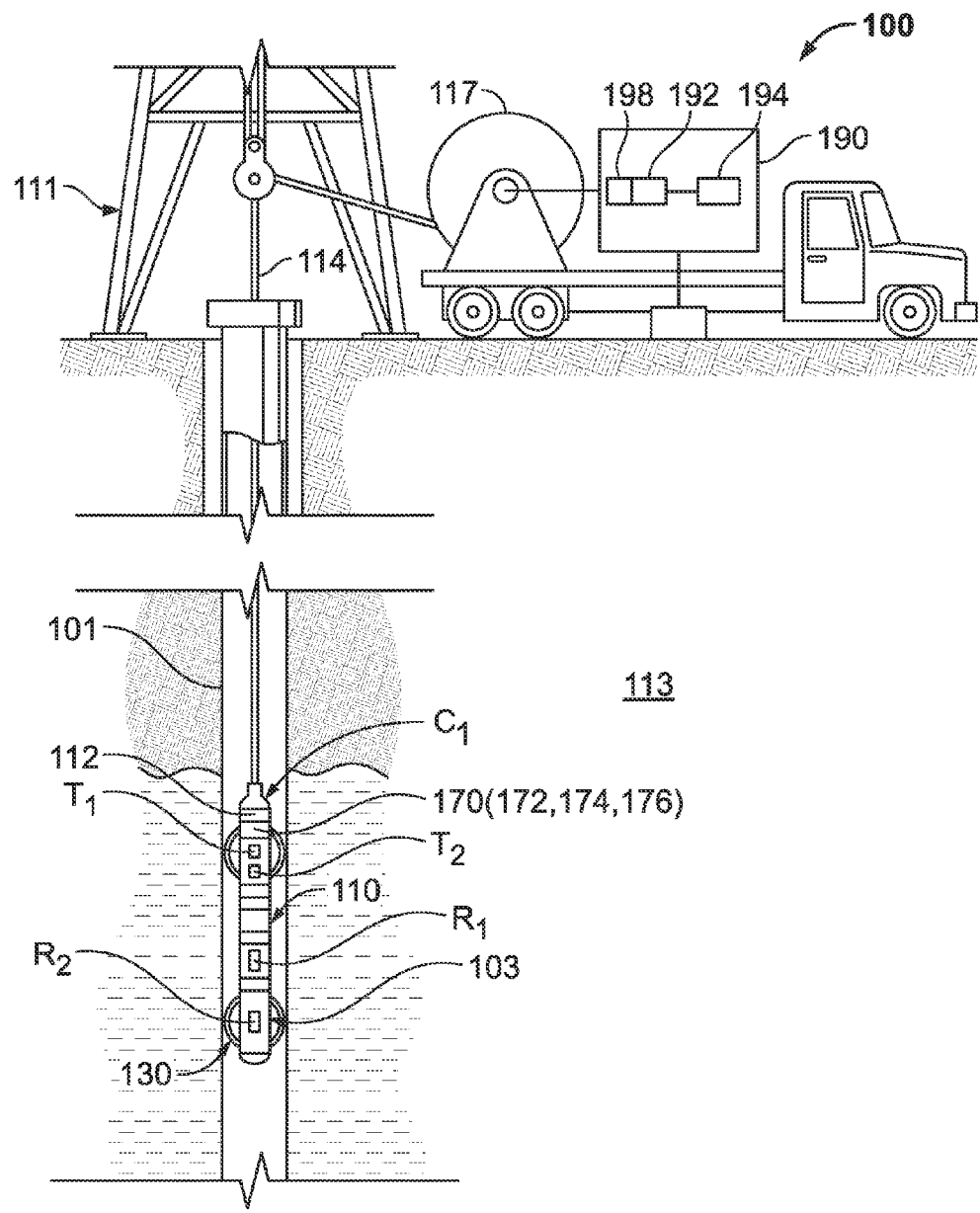
FIG. 1 shows an exemplary acoustic well logging tool configured to utilize acoustic sensors made according to this disclosure.

FIG. 1 shows a schematic illustration of an exemplary well logging system 100. System 100 is shown to include a logging instrument or tool 110 conveyed into a wellbore or borehole 101 formed in an earth formation 113. The tool 110 may be conveyed into the wellbore 101 by any suitable conveying member 114, such as an electrical armored cable (also referred to as "wireline"), a slick line, a coiled-tubing, etc. The conveying member 114 may be spooled on a winch 117 or similar device known in the art. The conveying member 114 may be conveyed into the wellbore 101 using a platform or rig 111 at the surface. The conveying member 114 is electrically connected at one end to a surface control unit 190 and at the other end to the tool 110. The control unit 190 may be a computer-based system configured to process data or signals provided by the tool 110 to estimate one or more parameters of interest, send command signals to various components of the tool 110 and generally control the operation of the tool 110. The control unit 190 includes a processor 192, a data storage device 194 and programs 198 to process data and control the operations of the tool 110. The control unit 190 may also include a display unit and peripherals to enter data and to provide a human interfaced. A telemetry unit or device 112 may be used to establish bi-directional data communication between the tool 110 and the control unit 190. The tool 110 also may include a control unit 170, which may further include a processor 172 (such as a microprocessor), data storage device 174, such a solid-state memory, and computer programs 176 configured to be used by the processor 172 for executing instructions contained in such programs 176. The signals transmitted by the tool 110 to the surface control unit 190 and the signals transmitted by the control unit 190 to the tool 110 are decoded, interpreted, recorded and processed by the respective control units.

Still referring to FIG. 1, the tool 110 is further shown to include exemplary transmitters T1 and T2. A transmitter circuit causes the transmitters T1 and T2 to transmit acoustic signals into the earth formation 113 via a fluid in the wellbore 101. Exemplary receivers R1 and R2, made according to one embodiment of the disclosure, as described in more detail in reference to FIGS. 2 and 3, receive acoustic signals reflected by the earth formation 113 in response to the transmitted signals. A suitable electrical circuit C1 conditions the received signals and the control unit 170 and/or 190 process such conditioned signals to provide information about a parameter of interest. The tool 110 shown in FIG. 1 illustrates an exemplary wireline tool that provides information for determining or estimating a parameter of interest or property of the formation 113, including, but not limited to, acoustic porosity, bed boundary location, etc. In another aspect or configuration, the tool 110 may utilize transducers on a member 130, which transducers are placed proximate to or in contact with the borehole wall 103 for imaging the borehole wall 103. For the purpose of this disclosure, any acoustic tool may utilize one or more transducers made according to the teaching herein for estimating or determining a property of interest. Although FIG. 1 shows a wireline acoustic tool, the tool 110 may be a measurement-while-drilling acoustic tool (also referred to a logging-while-drilling tool) for estimating a parameter or property of interest during drilling of a wellbore. For drilling applications, the tool may be a part of a drilling assembly that is conveyed into the wellbore 101 by a jointed-tubular or a coiled-tubing. The telemetry for communication of data between the tool 110 and the surface controller 190 may include any suitable telemetry method, including, but not limited to, mud pulse telemetry, radio frequency signal telemetry, electromagnetic telemetry; acoustic signal telemetry, and wired-pipe telemetry, including electrical conductors or optical fibers. The receivers made according to the concepts and embodiments disclosed herein may be used as hydrophones or geophones in any suitable apparatus configured to detect acoustic signals, including, but, not limited to, downhole acoustic tools, streamer cables, and land and under water seismic survey spreads. Such apparatus is known in the oil and gas industry and thus is not described herein.

Acoustic waves propagate as pressure waves or pressure pulses through various media, such as air, liquids, rock matrices, etc. Acoustic sensors employ one or more active elements that generate electrical signals when stressed by an incoming acoustic wave. Piezoelectric ceramics are commonly used as active elements. Piezoelectric elements used in acoustic sensors for downhole tools are relatively large and expensive. The present disclosure utilizes materials known as quantum tunneling composite (QTC) materials as active elements to form the acoustic sensors. A QTC material is a particle-filled polymer that exhibits extraordinary electrical resistance changes with small changes in pressure. In its normal state it is an excellent insulator ($10^{12}$ ohms) but, when compressed, with just finger pressure, it becomes a substantially perfect or near perfect conductor (less than 1 ohm), which is able to pass very high currents on the order of 10 amps through a 4 mm square that is 1.5 mm thick. One type of commercially available QTC material is comprised of numerous nickel fibers having sharp points imbedded in a silicone rubber matrix layer. Inventors have observed that the electrical resistance of such a QTC member can change by twelve orders of magnitude under finger pressure. It, thus, acts as a pressure dependent variable resistor. The mechanism for such a change is quantum mechanical tunneling of electrons, which mechanism depends exponentially on the intervening barrier. In use, under pressure, the thin silicone rubber matrix layer separating the many nickel points becomes slightly thinner, which greatly increases quantum mechanical tunneling of electrons across the silicone rubber when a voltage is applied across the material. The inventors have determined that such a QTC material can detect or sense vibrations and acoustic waves suitable for use in downhole logging tools, geophones and hydrophones, etc. Additionally, the inventors have determined that for certain applications, a relatively small QTC member, such as 2 mm×2 mm×1.0 member, may be utilized in a sensor. Such a QTC material is relatively inexpensive (by a factor of 100 to 1000) compared to the currently used piezoelectric ceramic members for making acoustic sensors for use in the oil and gas industry. Furthermore, silicone elastomers for the matrix material are available for high temperatures (e.g., 200° C.), such as the temperatures encountered downhole. Some acoustic downhole tools use as many as 24 acoustic sensors, while seismic spreads use several thousand geophones or hydrophones. Certain exemplary embodiments of sensors made using a QTC member are described in reference to FIGS. 2 and 3.

FIG. 2 is line diagram of an exemplary directional acoustic sensor 200 made according to one embodiment of the disclosure. The senor 200 includes a chamber 210 that houses a sensor element 220. The sensor element 220 includes an active element or member 222 made from a suitable QTC material. The sensor element 220 further includes a conductive layer 224 placed on a side 222a of the QTC member 222 and another conductive layer 226 placed on another side 222b of the QTC member 222. In one aspect, the conductive layers may comprise any suitable material, including conductive epoxies. The conductive layers 224 and 226 may be bonded on their respective sides 222a and 222b of the QTC member 222 or attached by any other suitable mechanism. In one aspect, the conductive layers 224 and 226 form electrodes for the sensor element 220. In the configuration of FIG. 2, the sensor element 220 is shown placed inside the chamber 210. In one embodiment, the QTC member 222 is a relatively thin member, such as 1.00 mm-1.5 mm thick. The sensor element 220 may be secured inside the chamber 210 in a direction along the axis 211 of the chamber 210. In one aspect, the sensor element 220 may be attached to the bottom 210a of the chamber 210. A "proof" mass 230 may be attached to the conductive epoxy layer 224, wherein the mass 230 is constrained or substantially constrained to move in the axial direction 211 while pushing or pulling on the QTC member 222. In such a configuration, the sensor element 220 is sensitive to the axial direction 211 and thus senses acoustic waves or vibrations that occur or are present along the axial direction 211. The empty volume 216 of the chamber is filled with a suitable electrically nonconductive medium 250, such as vacuum or an inert gas. If the medium 250 is an inert gas, the mass 230 is sufficiently porous that allows the gas 250 to fill in the area 212 so as to equalize pressure above and below the mass 230. Conductors 242 and 244 respectively coupled to the electrodes 224 and 226 pass from the chamber 210 to outside via a sealed feed through device or member 246. In operation, an acoustic wave present along the axial direction 211 applies a pressure on the QTC element 222, which causes the QTC member 222 to conduct current between 222a and 222a when a voltage is applied. Such a sensor is a direction sensitive like a geophone. The current signals from the sensor element 220 are transmitted to a circuit that amplifies and conditions the sensor signals. Controllers 170 and/or 190 (FIG. 1) process the conditioned signals and provide information about a parameter of interest, which in the case of a downhole tool may include, but not limited to, porosity, permeability, a bed boundary characteristic, and an image of the wellbore. In aspects, three sensors 200 may be oriented on a downhole tool along three orthogonal directions to detect acoustic signals from each such direction.

FIG. 3 is a line diagram of an exemplary non-directional acoustic sensor 300 made according to another embodiment of the disclosure (hydrophone configuration). The acoustic sensor 300 includes a sensor element 320 in a chamber 310. The sensor element 320 includes a QTC member 322 and a conductive material layer 324 on one side 322a of the QTC member 322 and a conductive material layer 326 on side 322b of the QTC member 322. The sides 322a and 322b are on the opposite sides of the QTC member 322. In one aspect, the sensor element 320 may be suspended in the chamber 310 by any suitable mechanism. In one aspect, the sensor element 320 may be suspended in the chamber 310 by members 330a and 330b attached to the side 322a of the sensor element 320 and by members 332a and 332b attached to the side 322b of the sensor element 320. In one aspect, the members 330a and 332a may be the conductors coupled to the electrodes 324 and 326. Alternatively, separate conductors 340a and 340b may be coupled to the conductive material layers 324 and 326 respectively. The acoustic impedance (density multiplied by sound speed) of the filling fluid 350 is matched as much as practicable to the acoustic impedance of the chamber 310 so as to maximize acoustic transmission through the walls of the chamber 310 to the QTC member 322. Suitable filling fluids may be high impedance, high temperature, and chemically-inert fluids, such as perfluoropolyether (PFPE), perfluoroalkylether (PFAE) or a polyphenylether (PPE). In the particular configuration of the sensor 300, acoustic signals present in any direction will apply pressure on the sensor element 322, causing it to pass electrical current when a voltage is applied thereto, thereby generating signals responsive the applied acoustic waves. The generated signals may be processed by the control unit 170 and/or 190 as described earlier in reference to FIG. 1. The sensors 200 and 300 are relatively small in size due to the very small size of the QTC members. Thus, more than one such sensor may be utilized at substantially the same location on downhole tool. Also, to increase sensor output and to improve resolution of a sensor, more than one sensor element may be placed in a common chamber, wherein the outputs of such sensor elements are added or stacked prior to amplification of the sensor element outputs. Also, any of the sensors made according to the disclosure herein may be utilized as vibration sensor. In aspects, vibration of a tool itself during operation may be detected by the sensors made in accordance with the disclosure herein. For example, sensors using QTC members may be used to monitor (and, in conjunction with a memory device, record) vibrations in the tool on the trip into the well and during the trip out of the wellbore to provide a quantitative indicator of the vibrations experienced by the tool.

Thus, in one aspect, the disclosure provides an apparatus for use downhole that includes at least one acoustic sensor that includes a sensor element made from a QTC material. In one configuration, the apparatus includes, a tool body and an acoustic sensor in the tool body, wherein the acoustic sensor includes a chamber and an active element comprised of a QTC material in the chamber. In another aspect, the acoustic sensor further includes a pair of conductive layers on a pair of sides of the active element, wherein each conductive layer is configured to act as an electrode. In yet another aspect, the acoustic sensor may further include a mass in the chamber configured to move the sensor element in a selected direction. In one aspect the selected direction is along a longitudinal axis of the chamber. In another aspect, the acoustic sensor is placed in the tool body along the longitudinal axis of the tool. In yet another aspect, the tool body includes three acoustic sensors along three orthogonal directions. In yet another aspect, the chamber is filled with an electrically non-conductive medium, such as an inert gas. In aspects, the apparatus includes a circuit configured to amplify and filter (conditions) signals from the acoustic sensor. A processor processes the conditioned signals according to programmed instructions provided to the processor and provides an estimate of a parameter of interest. In aspects, the parameter of interest may be selected from a group consisting of formation and tool parameters: (i) porosity; (ii) a boundary characteristic; and (iii) an image of a downhole condition, such as wellbore wall or bonding of cement between a casing and the wellbore wall; and (iv) the vibrations experienced by the tool, itself. The tool body may be configured to be conveyed into the wellbore by a wireline, coiled tubing, drilling tubular made by joining drill pipe sections, or slick line.

In another aspect, a method of making an acoustic sensor is provided, which method in one aspect may include: providing a chamber; placing in the chamber a sensor element that has an active element that is comprised of a QTC material and a first conductive layer on a first side of the senor element and a second conductive layer on a second side of the sensor element. In one aspect, the first and second sides of the sensor element oppose each other. In one aspect, the first and second conductive layers form the electrodes of the acoustic sensor.

In another aspect, the method may further include a mass coupled to the sensor element configured to allow the sensor element to move in a selected direction. In yet another aspect, the method further includes filling the chamber with an electrically non-conductive medium. In yet another aspect, the method may include suspending the sensor element in the chamber so that the sensor element is responsive to acoustic waves from any direction, thus making the making the sensor non-directional.

The foregoing disclosure is directed to certain specific embodiments and method for ease of explanation. Various changes and modifications to such embodiments, however, will be apparent to those skilled in the art. All such changes and modifications are considered to be a part of this disclosure and within the scope of any appended claims.

The invention claimed is:
1. An apparatus for use downhole, comprising:
  a tool for use downhole;
  an acoustic sensor in a body of the tool, the acoustic sensor including a chamber and an active element comprised of a quantum tunneling composite member in the chamber;
  a pair of conductive layers on a pair of sides of the active element, wherein each conductive layer is configured to act as an electrode; and
  a mass in the chamber configured to exert pressure on the active element along a selected direction in response to pressure pulses.
2. The apparatus of claim 1, wherein the chamber includes an electrically non-conductive medium in pressure communication with the active element.
3. The apparatus of claim 1, wherein the active element is placed between a side of the chamber and the mass.
4. The apparatus of claim 1, wherein the tool is selected from a group consisting of a wireline logging tool and a measurement-while-drilling tool.
5. The apparatus of claim 1 further comprising an electrical source configured to apply a voltage across the active element and wherein pressure pulses acting on the non-conductive medium apply pressure on the active element to cause the active element to generate electrical current signals.
6. The apparatus of claim 5 further comprising a processor configured to process the electrical current signals provide information about a parameter of interest.
7. The apparatus of claim 6, wherein the parameter of interest is selected from a group consisting of: (i) porosity; (ii) a boundary characteristic; and (iii) an image of a downhole condition.
8. An apparatus for use downhole, comprising:
  a tool for use downhole;
  an acoustic sensor in a body of the tool, the acoustic sensor including a chamber and an active element comprised of a quantum tunneling composite member suspended in the chamber; and
  a pair of conductive layers on a pair of sides of the active element, wherein each conductive layer is configured to act as an electrode.
9. The apparatus of claim 8, wherein the tool is selected from a group consisting of a wireline logging tool and a measurement-while-drilling tool.
10. The apparatus of claim 8 further comprising a non-conductive medium in the chamber that applies pressure on the active element in response to pressure pulses received by the non-conductive medium.
11. The apparatus of claim 8 further comprising an electrical source configured to apply a voltage across the active element and wherein pressure pulses acting on the non-con- ductive medium apply pressure on the active element to cause the active element to generate electrical current signals.

12. The apparatus of claim 11 further comprising a processor configured to process the electrical current signals to provide information about a parameter of interest.

13. The apparatus of claim 12, wherein the parameter of interest is selected from a group consisting of: (i) porosity; (ii) a boundary characteristic; and (iii) and image of a downhole condition.

14. An acoustic sensor comprising:
a chamber;
an active element comprised of a quantum tunneling composite member in the chamber;
a pair of conductive layers on a pair of sides of the active element, wherein each conductive layer acts as an electrode; and
a mass in the chamber in pressure communication with the active element.

15. The acoustic sensor of claim 14 further comprising:
an electrically non-conductive medium in the chamber that exerts pressure on the mass along a selected direction.

16. An acoustic sensor comprising:
a chamber;
an active element comprised of a quantum tunneling composite member suspended in the chamber; and
a pair of conductive layers on a pair of sides of the active element, wherein each conductive layer acts as an electrode.

17. The acoustic sensor of claim 16 further comprising a non-electrically conducting medium in the chamber surrounding the active element that enables the acoustic sensor to operate as a non-directional sensor.

18. A method of making an apparatus for use downhole, comprising:
providing a tool configured to be deployed downhole; and
providing a sensor in the tool that includes:
a chamber,
a sensor element including an active element containing a quantum tunneling member and pair of conductors coupled to the active element, and
a mass in the chamber in pressure communication with the sensor element.

19. The method of claim 18 further comprising providing a non-conductive medium in pressure communication with the mass.

20. The method of claim 18 further comprising processing signals generated by the sensor element to determine a property of interest.

21. A method of making an apparatus for use downhole, comprising:
providing a tool configured to be deployed downhole; and
providing a sensor in the tool that includes:
a chamber, and
a sensor element including an active element containing a quantum tunneling member suspended in the chamber and pair of conductors coupled to the active element.

22. The method of claim 21 further comprising processing signals generated by the sensor element to determine a property of interest.

23. The method of claim 21, further comprising providing a non-conductive medium in the chamber.

* * * * *